US008866806B2

United States Patent
Choi et al.

(10) Patent No.: US 8,866,806 B2
(45) Date of Patent: Oct. 21, 2014

(54) METHOD AND APPARATUS FOR SUPPLYING POWER TO AN ELECTRONIC DEVICE USING A SOLAR BATTERY

(75) Inventors: Kyung-Uk Choi, Asan-si (KR); Byeong-Doo Kang, Asan-si (KR); Yong-Soon Lee, Cheonan-si (KR); Seung-Hwan Moon, Asan-si (KR); Young-Suk Ha, Uiwang-si (KR); Jeong-Bong Lee, Busan (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 400 days.

(21) Appl. No.: 13/113,646

(22) Filed: May 23, 2011

(65) Prior Publication Data
US 2012/0120047 A1    May 17, 2012

(30) Foreign Application Priority Data

Nov. 17, 2010 (KR) .................. 10-2010-0114251

(51) Int. Cl.
| | |
|---|---|
| *G06F 3/038* | (2013.01) |
| *G09G 5/00* | (2006.01) |
| *G06F 1/16* | (2006.01) |
| *G06F 1/26* | (2006.01) |
| *H02J 7/35* | (2006.01) |

(52) U.S. Cl.
CPC .................. *H02J 7/35* (2013.01); *Y02E 10/566* (2013.01); *G06F 1/1635* (2013.01); *G06F 1/263* (2013.01); *G06F 1/1616* (2013.01)
USPC ....................................................... 345/212

(58) Field of Classification Search
USPC ................... 345/210–213; 320/101; 136/243; 113/210–213; 713/300
See application file for complete search history.

(56) References Cited

U.S. PATENT DOCUMENTS 4,240,021 A * 12/1980 Kashima et al. ............. 320/101
6,144,357 A * 11/2000 Jeong ............................ 345/100

(Continued)

FOREIGN PATENT DOCUMENTS

| JP | 2000-112441 | 4/2000 |
|---|---|---|
| JP | 2001-305508 | 10/2001 |
| KR | 1020050043065 | 5/2005 |

OTHER PUBLICATIONS

English Abstract for Publication No. 2001-305508.

(Continued)

*Primary Examiner* — Joseph Feild
*Assistant Examiner* — Gustavo Polo
(74) *Attorney, Agent, or Firm* — F. Chau & Associates, LLC (57) ABSTRACT

A power supply apparatus includes a storage battery, a power part and a solar battery part. The storage battery provides a charged voltage to an electronic device. The power part provides an external voltage to the electronic device and simultaneously charges the storage battery, upon determining that the external voltage is provided to the power supply apparatus. The solar battery part charges the storage battery using a voltage output by a solar battery upon determining that the external voltage is not provided to the power supply apparatus and the electronic device is not in use, and provides the voltage output by the solar battery and the charged voltage output by the storage battery to the electronic device, upon determining that the external voltage is not provided to the power supply apparatus and the electronic device is in use.

21 Claims, 7 Drawing Sheets

(56) References Cited

U.S. PATENT DOCUMENTS

| | | | |
|---|---|---|---|
| 6,873,322 B2 * | 3/2005 | Hartular | 345/212 |
| 7,615,962 B1 * | 11/2009 | Kuelbs | 320/101 |
| 2008/0052544 A1 * | 2/2008 | Hsieh et al. | 713/300 |

OTHER PUBLICATIONS

English Abstract for Publication No. 2000-112441.
English Abstract for Publication No. 1020050043065.

* cited by examiner

METHOD AND APPARATUS FOR SUPPLYING POWER TO AN ELECTRONIC DEVICE USING A SOLAR BATTERY

CROSS-REFERENCE TO RELATED APPLICATION

This application claims priority under 35 U.S.C. §119 to Korean Patent Application No. 10-2010-0114251, filed on Nov. 17, 2010, the disclosure of which is incorporated by reference herein in its entirety.

BACKGROUND

1. Technical Field

Exemplary embodiments of the present invention relate to a method of supplying power, a power supply apparatus for performing the method, and a display apparatus having the power supply apparatus. More particularly, exemplary embodiments of the present invention relate to a method of supplying power capable of extending a discharge time of a battery, a power supply apparatus for performing the method, and a display apparatus having the power supply apparatus.

2. Discussion of the Related Art

Solar energy technology refers to technology capable of converting sunlight into electricity, which can then be used to drive a variety of electronic devices. Solar energy is an inexhaustible and harmless energy resource, and its use includes many benefits. For example, solar energy can be used to generate electricity without producing pollution such as air pollution, noise pollution, or greenhouse gases. Further, solar energy can be utilized in any area that receives sunlight, and does not require fuel transportation or the use of a power generator. As a result, the use of solar energy is becoming more prevalent in today's society.

However, solar energy has a low energy converting efficiency, and as a result, utilization of solar energy technology may include a large setup size. Further, power obtained using solar energy may be unstable depending on the strength of received sunlight and the incident angle of the received sunlight.

A portable electronic device such as, for example, a laptop computer, a mobile communication terminal, a personal digital assistant (PDA), or a portable multimedia player (PMP) receives its power from a battery. A usable time of the portable electronic device is determined by the amount of time the battery can provide power. As a result, the battery for a portable electronic device must be frequently charged.

In light of the above, a technology in which a standard battery is charged using a solar battery has been developed. However, since standard batteries have characteristics similar to a capacitor, a charging operation and a discharging operation are not simultaneously performed. That is, the standard battery may be charged using the solar battery only when the portable electronic device is not in use.

SUMMARY

Exemplary embodiments of the present invention provide a method of supplying power capable of extending a discharge time of a battery.

Exemplary embodiments of the present invention further provide a power supply apparatus for performing the above-mentioned method.

Exemplary embodiments of the present invention further provide a display apparatus having the above-mentioned power supply apparatus.

According to an exemplary embodiment of the present invention, a method of supplying power includes providing an external voltage to an electronic device and simultaneously charging a storage battery, upon determining that the external voltage is provided to a power supply apparatus. The method further includes charging the storage battery using a voltage output by a solar battery, upon determining that the external voltage is not provided to the power supply apparatus and the electronic device is not in use. The method further includes providing the voltage output by the solar battery and a charged voltage output by the storage battery to the electronic device, upon determining that the external voltage is not provided to the power supply apparatus and the electronic device is in use.

In an exemplary embodiment of the present invention, the voltage output by the solar battery and the charged voltage output by the storage battery are provided to the electronic device upon determining that a control signal is in a first logic state, and the storage battery is charged using the voltage output by the solar battery upon determining that the control signal is in a second logic state.

In an exemplary embodiment of the present invention, the method further includes adding the voltage output by the solar battery and the charged voltage output by the storage battery upon determining that the control signal is in the first logic state.

In an exemplary embodiment of the present invention, the method further includes boosting the voltage output by the solar battery upon determining that the control signal is in the first logic state.

In an exemplary embodiment of the present invention, boosting the voltage output by the solar battery includes outputting a feedback signal based on a voltage difference between the voltage output by the solar battery and the charged voltage of the storage battery, and boosting the voltage output by the solar battery based on the feedback signal, wherein the boosted voltage is substantially the same as the charged voltage.

According to an exemplary embodiment of the present invention, a power supply apparatus includes a storage battery, a power part and a solar battery part. The storage battery is configured to provide a charged voltage to an electronic device. The power part is configured to provide an external voltage to the electronic device and simultaneously charge the storage battery, upon determining that the external voltage is provided to the power supply apparatus. The solar battery part is configured to charge the storage battery using a voltage output by a solar battery upon determining that the external voltage is not provided to the power supply apparatus and the electronic device is not in use, and provide the voltage output by the solar battery and the charged voltage output by the storage battery to the electronic device upon determining that the external voltage is not provided to the power supply apparatus and the electronic device is in use.

In an exemplary embodiment of the present invention, the solar battery part may include a solar battery, a battery life extending part, a mode selecting part and a connecting part. The solar battery is configured to generate a voltage using a received light. The battery life extending part is configured to provide the electronic device with the voltage generated by the solar battery and the charged voltage of the storage battery. The mode selecting part is configured to provide the storage battery or the battery life extending part with the voltage generated by the solar battery, based on a control signal. The connecting part is configured to electrically connect the solar battery and the mode selecting part, based on the external power.

In an exemplary embodiment of the present invention, the battery life extending part is configured to add the voltage output by the solar battery and the charged voltage output by the storage battery.

In an exemplary embodiment of the present invention, the solar battery part may further include a converter configured to boost the voltage output by the solar battery and provide the mode selecting part with the boosted voltage.

In an exemplary embodiment of the present invention, the battery life extending part may include a comparator configured to provide a feedback signal to the converting part, wherein the feedback signal is based on a voltage difference between the voltage output by the solar battery and the charged voltage.

In an exemplary embodiment of the present invention, the converting part may be configured to boost the voltage output by the solar battery, and the boosted voltage is substantially the same as the charged voltage.

In an exemplary embodiment of the present invention, the solar battery part may include the solar battery configured to generate a voltage using a received light, and a switching part configured to electrically connect the solar battery to one of the storage battery or the electronic device based on a control signal.

According to an exemplary embodiment of the present invention, a display apparatus includes a display panel, a backlight assembly disposed below the display panel, and configured to provide the display panel with a light in response to an enable signal, and a power supply apparatus. The power supply apparatus includes a storage battery, a power part and a solar battery part. The storage battery is configured to provide a charged voltage to the display apparatus. The power part is configured to provide an external voltage to the display apparatus and simultaneously charge the storage battery, upon determining that the external voltage is provided to the display apparatus. The solar battery part is configured to charge the storage battery using a voltage output by a solar battery upon determining that the external voltage is not provided to the power supply apparatus and the display apparatus is not in use, and provide the voltage output by the solar battery and the charged voltage output by the storage battery to the display apparatus, upon determining that the external voltage is not provided to the power supply apparatus and the display apparatus is in use.

In an exemplary embodiment of the present invention, the solar battery part may include the solar battery, a battery life extending part, a mode selecting part and a connecting part. The solar battery is configured to generate a voltage using a light. The battery life extending part is configured to provide the display apparatus with the voltage generated by the solar battery and the charged voltage of the storage battery. The mode selecting part is configured to provide the storage battery or the battery life extending part with the voltage generated by the solar battery, based on a control signal. The connecting part is configured to electrically connect the solar battery and the mode selecting part, based on the external power.

In an exemplary embodiment of the present invention, the control signal may function as the enable signal provided to the backlight assembly.

In an exemplary embodiment of the present invention, the battery life extending part may be configured to add the voltage output by the solar battery and the charged voltage output by the storage battery.

In an exemplary embodiment of the present invention, the solar battery part may further include a converter configured to boost the voltage output by the solar battery and provide the mode selecting part with the boosted voltage.

In an exemplary embodiment of the present invention, the battery life extending part may include a comparator configured to provide a feedback signal to the converting part. The feedback signal is based on a voltage difference between the voltage output by the solar battery and the charged voltage.

In an exemplary embodiment of the present invention, the converting part may be configured to boost the voltage output by the solar battery. The boosted voltage may be substantially the same as the charged voltage.

In an exemplary embodiment of the present invention, the solar battery part may include a solar battery configured to generate a voltage using a received light, and a switching part configured to electrically connect the solar battery to one of the storage battery or the display apparatus based on a control signal.

According to an exemplary embodiment of the present invention, a solar battery part includes a solar battery, a mode selecting part, and a battery life extending part. The solar battery is configured to generate a voltage using a received light. A mode selecting part is configured to receive a control signal and select one of a charging mode or a life extending mode based on the control signal. The battery life extending part is configured to provide the voltage generated by the solar battery to a storage battery while in the charging mode, and to an electronic device while in the life extending mode.

In an exemplary embodiment of the present invention, the solar battery part may include a converting part configured to boost the voltage generated by the solar battery, and provide one of the voltage generated by the solar battery or the boosted voltage to the mode selecting part.

In an exemplary embodiment of the present invention, the battery life extending part may include a plurality of diodes configured to prevent a current leakage.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EXEMPLARY EMBODIMENTS

Exemplary embodiments of the present invention will be described more fully hereinafter with reference to the accompanying drawings. Like reference numerals refer to like elements throughout the accompanying drawings.

Figure 1:
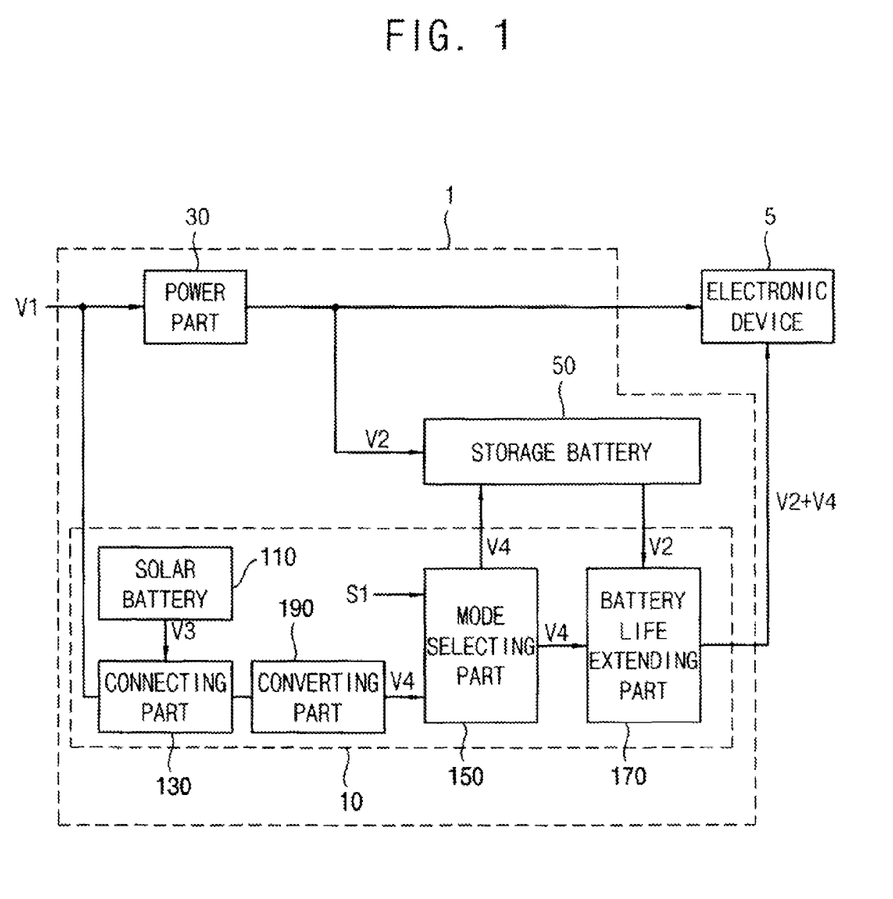
FIG. 1 is a block diagram of a power supply apparatus according to an exemplary embodiment of the present invention.
Figure 2:
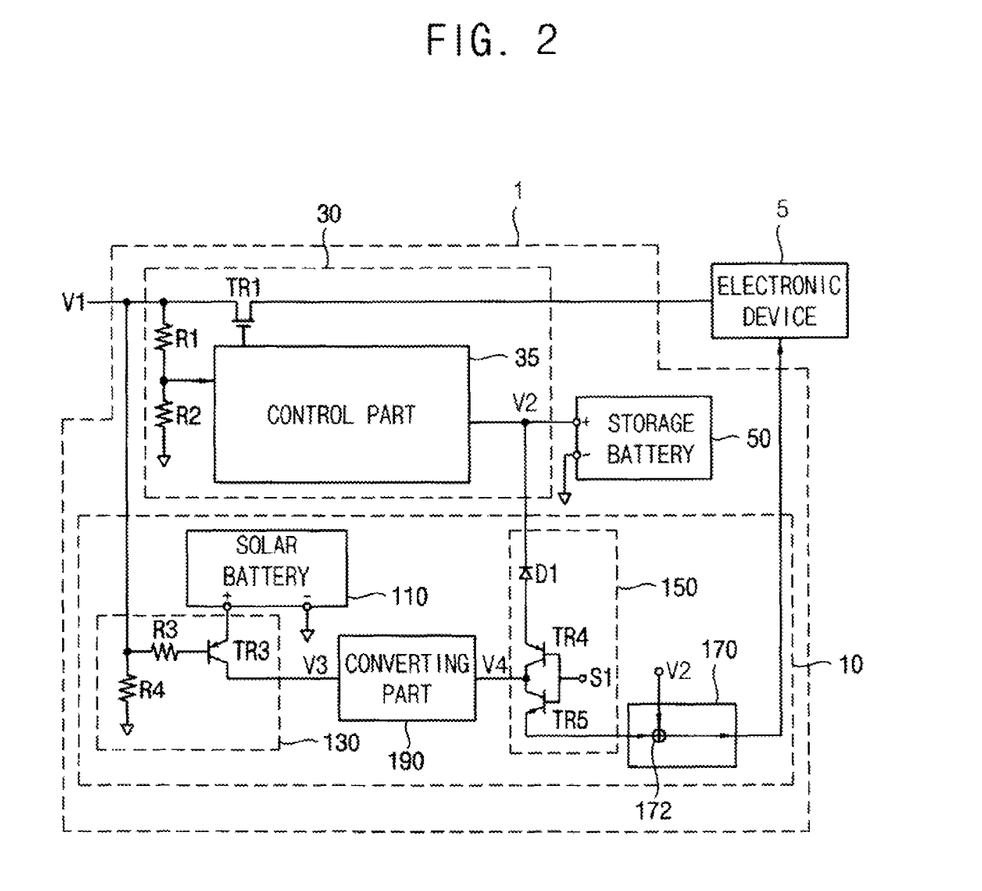
FIG. 2 is a circuit diagram of the power supply apparatus of FIG. 1.
Figure 3:
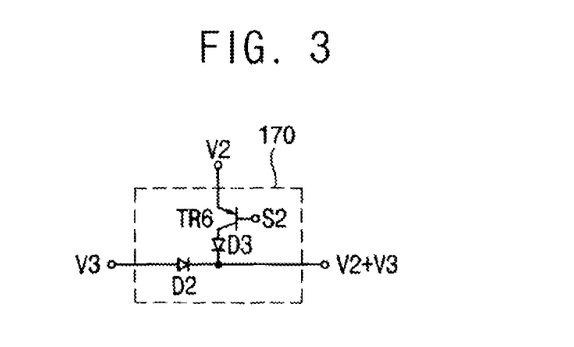
FIG. 3 is a circuit diagram of a battery life extending part of the power supply apparatus of FIG. 2.

FIG. 1 is a block diagram of a power supply apparatus 1 according to an exemplary embodiment of the present invention. FIG. 2 is a circuit diagram of the power supply apparatus 1 of FIG. 1. FIG. 3 is a circuit diagram of a battery life extending part 170 of FIG. 2.

Referring to FIGS. 1 and 2, a power supply apparatus 1 includes a solar battery part 10, a power part 30 and a storage battery 50. The power supply apparatus 1 supplies power to an electronic device 5.

The electronic device 5 may be, for example, a portable handheld display apparatus such as a laptop computer, a mobile communication terminal, a personal digital assistant (PDA), or a portable multimedia player (PMP), however the electronic device 5 is not limited thereto.

When an external voltage V1 is provided from an external device (not shown) to the power part 30, the power part 30 provides the electronic device 5 and a storage battery 50 with the external voltage V1. Thus, the electronic device 5 is driven by the external voltage V1, and the external voltage V1 is used to charge the storage battery 50.

The power part 30 may include a first transistor TR1, a control part 35, a first resistor R1 and a second resistor R2. The first transistor TR1 electrically connects the external voltage V1 to the electronic device 5. The control part 35 decreases a level of the external voltage V1. The decreased voltage may be supplied to the storage battery 50. The first resistor R1 and the second resistor R2 divide the external voltage V1.

The storage battery 50 may repeat a charging operation and a discharging operation in accordance with certain conditions. For example, when the external voltage V1 is provided to the electronic device 5, the storage battery 50 is charged using the voltage V2 provided from the control part 35. The storage battery 50 accumulates an electrical energy by converting the electrical energy provided from the control part 35 into a chemical energy.

When the external voltage V1 is not provided to the electronic device 5 and the electronic device 5 is in use, the storage battery 50 provides the electronic device 50 with the charged voltage V2. That is, the storage battery 50 discharges an accumulated chemical energy by converting the accumulated chemical energy into an electrical energy.

The charged voltage V2 may be substantially equal to or lower than the external voltage V1. For example, in an exemplary embodiment, the charged voltage V2 may be about 12.6 V, and the external voltage V1 may be about 19 V.

The solar battery part 10 includes a solar battery 110, a connecting part 130, a mode selecting part 150 and a battery life extending part 170. The solar battery part 10 may further include a converting part 190 disposed between the connecting part 130 and the mode selecting part 150. The solar battery part 10 may be utilized when the external voltage V1 is not provided.

For example, when the external voltage V1 is not provided, the solar battery part 10 charges the storage battery 50 using the voltage V3 supplied by the solar battery 110, or provides the electronic device 5 with the voltage V3 supplied by the solar battery 110.

The solar battery 110 converts incident solar light into electrical energy. For example, when light is incident to a surface of the solar battery 110, electrons and holes are generated at an inner portion of the solar battery 110. As a result, a photo electromotive force, which results from an electrical potential difference between two electrodes due to a movement of the electrons, is generated. When a load is connected to the solar battery 110, a current flows through the load and the solar battery 110.

The connecting part 130 connects or disconnects the solar battery 110 and a load based on the external voltage V1. For example, when the external voltage V1 is not provided to the electronic device 5, the connecting part 130 connects the solar battery 110 to the mode selecting part 150 or to the converting part 190. Alternatively, when the external voltage V1 is provided to the electronic device 5, the connecting part 130 disconnects the solar battery 110 from the mode selecting part 150 and the converting part 190.

The connecting part 130 may include a switch. The switch may be, for example, a bipolar transistor which receives the external voltage V1 through a control electrode.

In the present exemplary embodiment, the connecting part 130 may include a third transistor TR3, a third resistor R3 connected to a control electrode of the third transistor TR3, and a fourth resistor R4 connected to the control electrode of the third transistor TR3 and ground. However, the connecting part 130 is not limited to this configuration.

The converting part 190 may boost the voltage V3 of the solar battery 110 and may provide the mode selecting part 150 with the boosted voltage V4. The boosted voltage V4 may be substantially equal to the charged voltage V2. The converting part 190 may stably provide the voltage V3 of the solar battery 10 to the mode selecting part 150. The voltage V4 may have a voltage difference in accordance with a light source.

Hereinafter, it is to be understood that the voltage provided to the mode selecting part 150 may be the voltage V3 of the solar battery 110, or the boosted voltage V4 of the converting part 190. However, for convenience of description, the following exemplary embodiments describe the voltage provided to the mode selecting part 150 as the voltage V3 of the solar battery 110.

The mode selecting part 150 selects a charging mode or a life extending mode, based on a first control signal S1. In the charging mode, the storage battery 50 is charged using the voltage V3 of the solar battery 110. In the life extending mode, the voltage V3 of the solar battery 110 and the charged voltage V2 of the storage battery 50 are provided to the electronic device 5.

In addition to being used to select the charging mode or the life extending mode, the first control signal S1 may control other functions of the electronic device 5. For example, the first control signal S1 may further be used as an enable signal for enabling a backlight assembly included in the electronic device 5. Thus, for example, when the first control signal S1 (e.g., the enable signal) is high, the backlight assembly in the electronic device 5 may be enabled, and the storage battery 50 may be discharged.

For example, when the first control signal S1 is low, the mode selecting part 150 may select the charging mode, and when the first control signal S1 is high, the mode selecting part 150 may select the life extending mode. Alternatively, the charging mode may be entered when the first control signal S1 is high, and the life extending mode may be selected when the first control signal S1 is low.

When the storage battery 50 is not substantially discharged, the voltage V3 of the solar battery 110 may be provided to the storage battery 50 to charge the storage battery 50. In contrast, when the storage battery 50 is substantially discharged, the voltage V3 of the solar battery 110 and the charged voltage V2 of the storage battery 50 may be provided to the electronic device 5.

In the present exemplary embodiment, the mode selecting part 150 may include a fourth transistor TR4 that is turned on in response to a low level of the first control signal S1, and a fifth transistor TR5 that is turned on in response to a high level of the first control signal S1. However, the mode selecting part 150 is not limited to this configuration.

When the mode selecting part 150 selects the charging mode, the voltage V3 of the solar battery 110 is provided to the storage battery 50 to charge the storage battery 50. The mode selecting part 150 may include a first diode D1 to prevent a current leakage.

When the mode selecting part 150 selects the life extending mode, the voltage V3 of the solar battery 110 is provided to the battery life extending part 170, and is in turn provided to the electronic device 5.

When the life extending mode is selected, the battery life extending part 170 provides the electronic device 5 with the voltage V3 of the solar battery 110 and the charged voltage V2 of the storage battery 50. Since the charged voltage V2 supplied to the electronic device 5 is supplemented by the voltage V3 of the solar battery 110, the discharge of the charged voltage V2 of the storage battery 50 is decreased. Thus, the discharge time of the storage battery 50 may be extended.

When the life extending mode is selected, the charged voltage V2 of the storage battery 50 may be provided to the electronic device 5 through a path different from the path of the voltage V3 of the solar battery 110. In addition, the charged voltage V2 of the storage battery 50 is added to the voltage V3 of the solar battery 110, and both voltages V2 and V3 are provided to the electronic device 5.

The battery life extending part 170 may include an adder 172 which adds the voltage V3 of the solar battery 110 and the charged voltage V2 of the storage battery 50. The adder 172 may be constructed by connecting the voltage V3 of the solar battery 110 and the charged voltage V2 of the storage battery 50.

In an exemplary embodiment, a plurality of diodes may be included in the battery life extending part 170 to prevent current leakage at the solar battery 110 and the storage battery 50, as shown in FIG. 3.

For example, the battery life extending part 170 may include a sixth transistor TR6, a second diode D2 and a third diode D3. The sixth transistor TR6 includes a control electrode receiving a second control signal S2. The second diode D2 prevents a current leakage from being generated at the solar battery 110. The third diode D3 prevents a current leakage from being generated at the storage battery 50.

The second control signal S2 may be similar to the first control signal S1, and may be used as an enable signal for the backlight assembly included in the electronic device 5.

Figure 4:
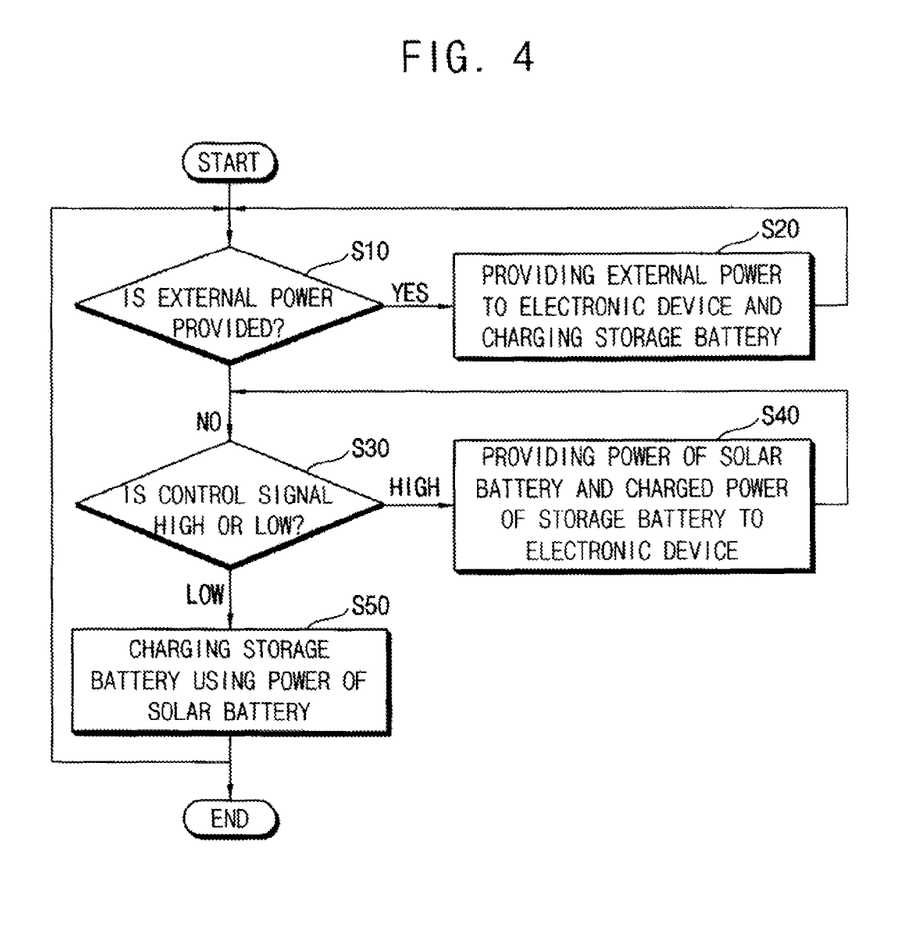
FIG. 4 is a flowchart showing a power supplying method of the power supply apparatus of FIG. 1.

FIG. 4 is a flowchart showing a power supplying method of the power supply apparatus of FIG. 1.

Referring to FIGS. 1 and 4, the power supply apparatus 1 determines whether the external voltage V1 is provided at block S10. If the external voltage V1 is provided to the power supply apparatus 1, the power supply apparatus 1 provides the electronic device 5 with the external voltage V1 and simultaneously charges the storage battery 50 at block S20.

If the external voltage V1 is not provided to the power supply apparatus 1, it is determined whether the first control signal S1 provided to the mode selecting part 150 is high or low at block S30.

If the first control signal S1 is high, the mode selecting part 150 selects the life extending mode, and the voltage V3 of the solar battery 110 and the charged voltage V2 of the storage battery 50 are provided to the electronic device 5 at block S40. The first control signal S1 may be high when the electronic device 5 is in use.

If the first control signal S1 is low, the mode selecting part 150 selects the charging mode, and the voltage V3 of the solar battery 110 is provided to the storage battery 50 to charge the storage battery 50 at block S50. The first control signal S1 may be low when the electronic device 5 is not in use.

Alternatively, the life extending mode may be selected while the first control signal S1 is low, and the charging mode may be selected when the first control signal S1 is high.

In the present exemplary embodiment, the power supply apparatus 1 may be operated in three different situations. For example, when the external voltage V1 is provided, the power supply apparatus 1 may provide the electronic device 5 with the external voltage V1 and simultaneously charge the storage battery 50. When the external voltage V1 is not provided and the electronic device 5 is not in use, the voltage V3 of the solar battery 110 may be provided to the storage battery 50 to charge the storage battery 50. When the external voltage V1 is not provided and the electronic device 5 is in use, the voltage V3 of the solar battery 110 and the charged voltage V2 of the storage battery 50 may be provided to the electronic device 5.

Thus, in the present exemplary embodiment, when the storage battery 50 is discharged and is unable to provide a voltage to the electronic device 5, the voltage V3 of the solar battery 110 may be provided to the electronic device 5, thus increasing an efficiency of the solar battery 110. Further, when the storage battery 50 is not discharged, the voltage V3 of the solar battery 110 and the charged voltage V3 of the storage battery 50 may be simultaneously provided to the electronic device 5, thus extending the discharge time of the storage battery 50.

Figure 5:
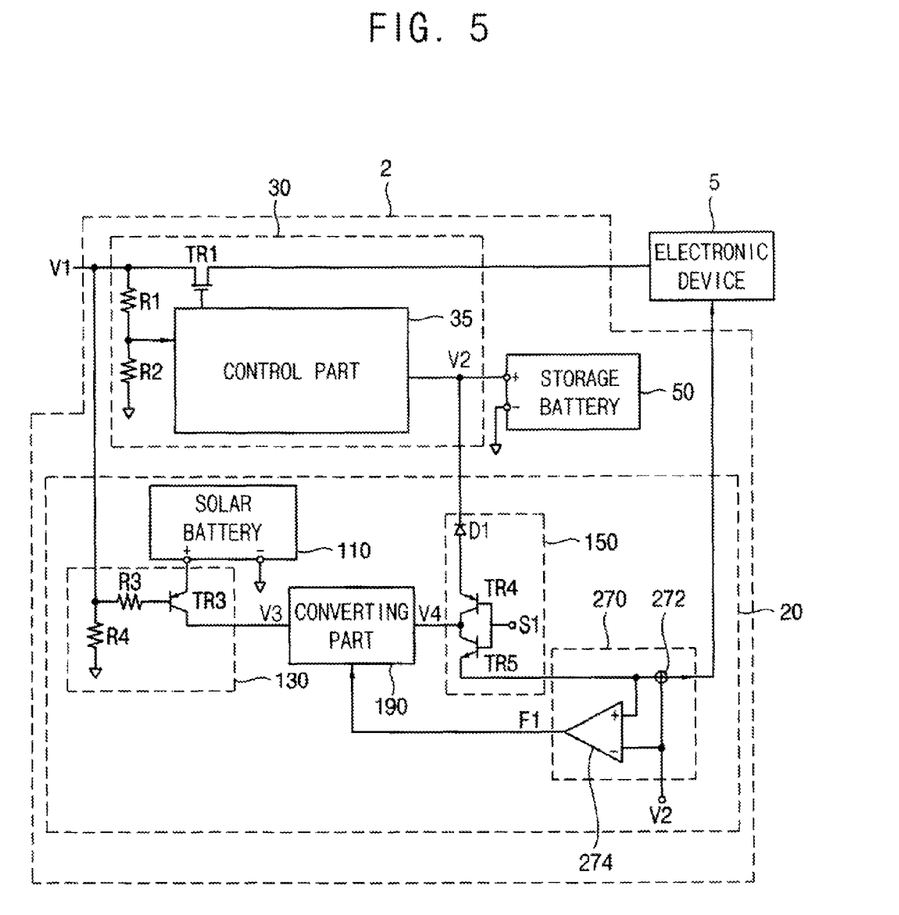
FIG. 5 is a circuit diagram of a power supply apparatus according to an exemplary embodiment of the present invention.

FIG. 5 is a circuit diagram of a power supply apparatus according to an exemplary embodiment of the present invention.

Referring to FIG. 5, the power supply apparatus 2 according to the present exemplary embodiment is substantially similar to the power supply apparatus 1 of FIGS. 1 and 2 except for a battery life extending part 270 of a solar battery part 2. Thus, the same reference numerals will be used to refer to the same or like parts as those described in FIGS. 1 and 2, and any repetitive detailed explanation for the power supply apparatus will hereinafter be omitted.

The solar battery part 20 according to the present exemplary embodiment includes a solar battery 110, a connecting part 130, a converting part 190, a mode selecting part 150 and a battery life extending part 270.

The battery life extending part 270 may provide the electronic device 5 with the boosted voltage V4 of the solar battery 110 when a charged voltage V2 of the storage battery 50 is provided to the electronic device 5.

The battery life extending part 270 may include an adder 272 and a comparator 274. Since a voltage level of the charged voltage V2 of the storage battery 50 is decreased over time, the battery life extending part 270 may supplement the boosted voltage V4 of the solar battery 110 with the charged voltage V2 of the storage battery 50.

The adder 272 may be constructed by connecting the boosted voltage V4 of the solar battery 110 and the charged voltage V2 of the storage battery 50. The battery life extending part 170 may further include a plurality of diodes to prevent current leakage into the solar battery 110 and the storage battery 50.

The comparator 274 compares the boosted voltage V4 of the solar battery 110 with the charged voltage V2 of the storage battery 50, and outputs a feedback signal F1 to the converting part 190. The feedback signal F1 is the difference between the boosted voltage V4 of the solar battery 110 and the charged voltage V2 of the storage battery 50. The comparator 274 may include an operational amplifier.

The converting part 190 may control the boosted voltage V4 of the solar battery 110 based on the feedback signal F1 such that the boosted voltage V4 is substantially the same as the charged voltage V2 of the storage battery 50.

If the boosted voltage V4 of the solar battery 110 is substantially equal to the charged voltage V2 of the storage battery 50, a current leakage is not generated, even though the two voltages V4 and V2 are connected to each other. Thus, in this case, the adder 272 may not include the plurality of diodes for preventing a current leakage. The adder 272 may be constructed by connecting the boosted voltage V4 of the solar battery 110 and the charged voltage V2 of the storage battery 50.

The converting part 190 may operate in response to the first control signal S1. When in the life extending mode, the converting part 190 may control the boosted voltage V4 of the solar battery 110 such that the boosted voltage V4 is substantially the same as the charged voltage V2 of the storage battery 50.

In the present exemplary embodiment, the adder 270 may add the charged voltage V2 of the storage battery 50 and the voltage V3 of the solar battery 115, and provide the added voltage to the electronic device 5. Alternatively, the adder 270 may be omitted. When the adder 270 is omitted, the charged voltage V2 of the storage battery 50 may be provided to the electronic device 5 through a path different from the path of the voltage V3 of the solar battery 115.

A method of supplying power by the power supply apparatus 2 according to the present exemplary embodiment is substantially the same as the method described in FIG. 4. However, once the voltage V3 of the solar battery 110 and the charged voltage V2 of the storage battery 50 are provided to the electronic device 5 at block S40, the power supply apparatus 2 may use the feedback signal F1 to control the boosted voltage V4 of the solar battery 110 such that it is substantially the same as the charged voltage V2 of the storage battery 50.

In the present exemplary embodiment, when in the life extending mode, the boosted voltage V4 of the solar battery 110 and the charged voltage V2 of the storage battery 50 are provided to the electronic device 5. The boosted voltage V4 of the solar battery 110 may be substantially equal to the charged voltage V2 of the storage battery 50 due to the comparator 274 of the battery extending part 270.

A current leakage generated at the solar battery 110 and the storage battery 50 may be prevented to enhance the efficiency of the power supply apparatus 2.

Figure 6:
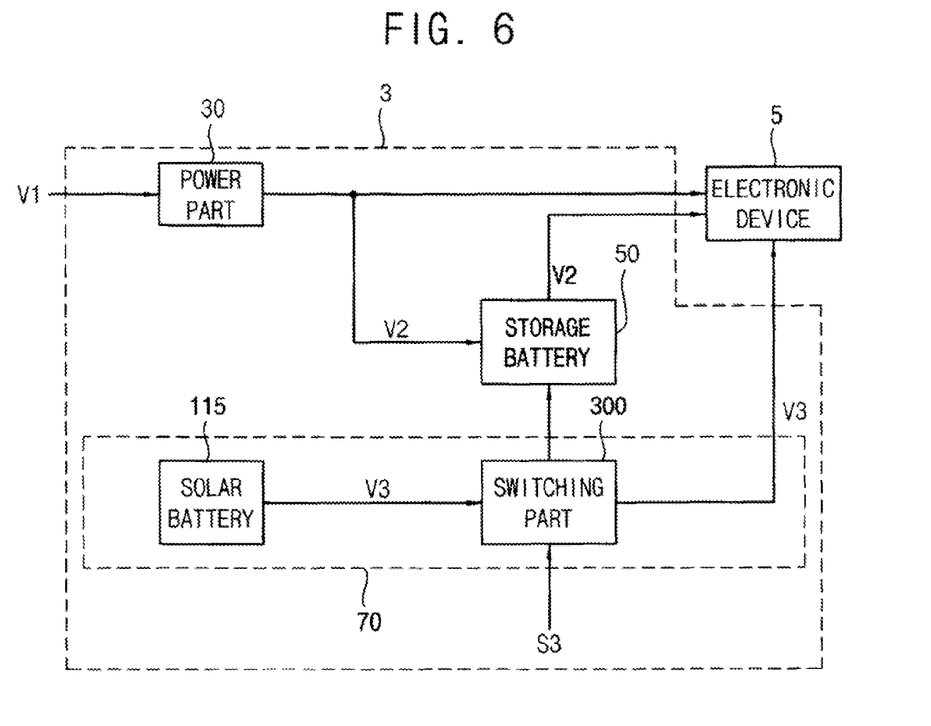
FIG. 6 is a circuit diagram of a power supply apparatus according to an exemplary embodiment of the present invention.
Figure 7:
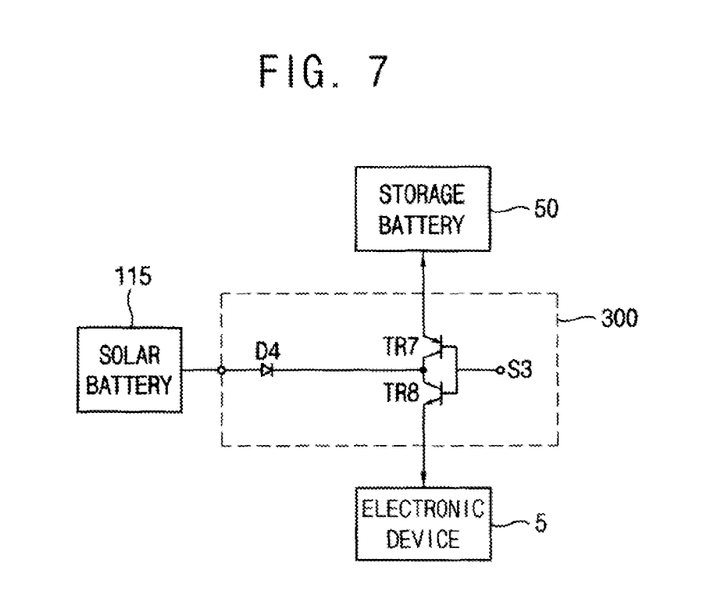
FIG. 7 is a block diagram of a switching part of the power supply apparatus of FIG. 6.

FIG. 6 is a circuit diagram of a power supply apparatus 3 according to an exemplary embodiment of the present invention. FIG. 7 is a block diagram of a switching part 300 of the power supply apparatus 3 of FIG. 6.

Referring to FIG. 6, the power supply apparatus 3 according to the present exemplary embodiment is substantially similar to the power supply apparatus 1 of FIGS. 1 and 2 except for a solar battery part 70. Thus, the same reference numerals will be used to refer to the same or like parts as those described in FIGS. 1 and 2, and any repetitive detailed explanation for the power supply apparatus will hereinafter be omitted.

The solar battery part 70 includes a solar battery 115 and a switching part 300.

The switching part 300 provides the voltage V3 of the solar battery 115 to the storage battery 50 or the electronic device 5, based on a third control signal S3.

The third control signal S3 may control other functions of the electronic device 5. For example, the third control signal S3 may further be used as an enable signal for enabling a backlight assembly included in the electronic device 5. Thus, for example, when the third control signal S4 (e.g., the enable signal) is high, the backlight assembly in the electronic device 5 may be enabled, and the storage battery 50 may be discharged.

For example, when the third control signal S3 is low, the switching part 300 may connect the solar battery 115 and the storage battery 50, and when the third control signal S3 is high, the switching part 300 may connect the solar battery 115 and the electronic device 5.

When the storage battery 50 is not substantially discharged, the voltage V3 of the solar battery 115 may be provided to the storage battery 50 to charge the storage battery 50. In contrast, when the storage battery 50 is substantially discharged, the voltage V3 of the solar battery 115 and the charged voltage V2 of the storage battery 50 may be provided to the electronic device 5.

In the present exemplary embodiment, the charged voltage V2 of the storage battery 50 may be provided to the electronic device 5 through a path different from the path of the voltage V3 of the solar battery 115. Alternatively, the charged voltage V2 of the storage battery 50 and the voltage V3 of the solar battery 115 may be added and provided to the electronic device 5 through the same path. In this case, the power supply apparatus 3 according to the present exemplary embodiment may further include an adder for adding the charged voltage V2 of the storage battery 50 and the voltage V3 of the solar battery 115.

As shown in FIG. 7, the switching part 300 may include a seventh transistor TR7 that is turned on in response to a low level of the third control signal S3, and an eighth transistor TR8 that is turned on in response to a high level of the third control signal S3.

The switching part 300 may further include a fourth diode D4 for preventing a current leakage generated in the solar battery 115. Moreover, although not shown in FIG. 7, the switching part 300 may further include a plurality of diodes for preventing a current leakage generated in the storage battery 50 and the electronic device 5. The switching part 300 of FIG. 7 may include various configurations.

In the present exemplary embodiment, when an inner resistance of the solar battery 115 is large, and the voltage V3 of the solar battery 115 is substantially equal to or greater than the external voltage V1 or the charged voltage V2 of the storage battery 50, the design of the solar battery part 70 may be simplified.

Figure 8:
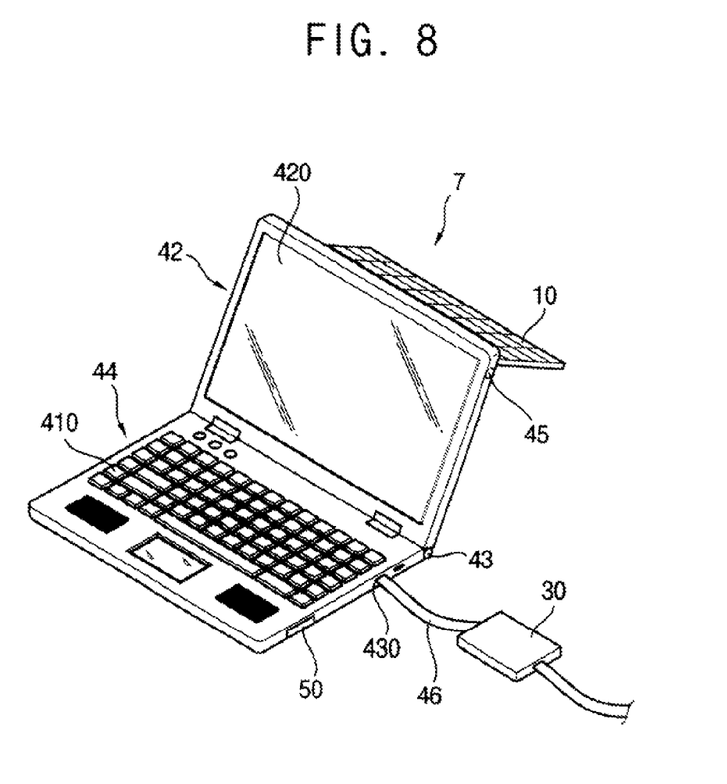
FIG. 8 is a perspective diagram of a display apparatus including the power supply apparatus of FIG. 1.
Figure 9:
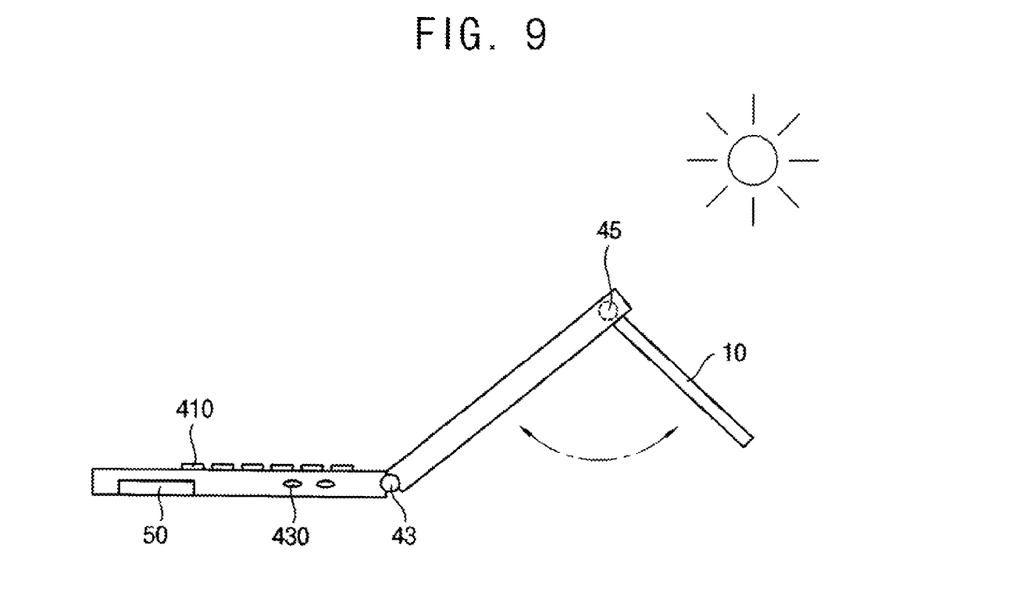
FIG. 9 is a side view of the display apparatus shown in FIG. 8.
Figure 10:
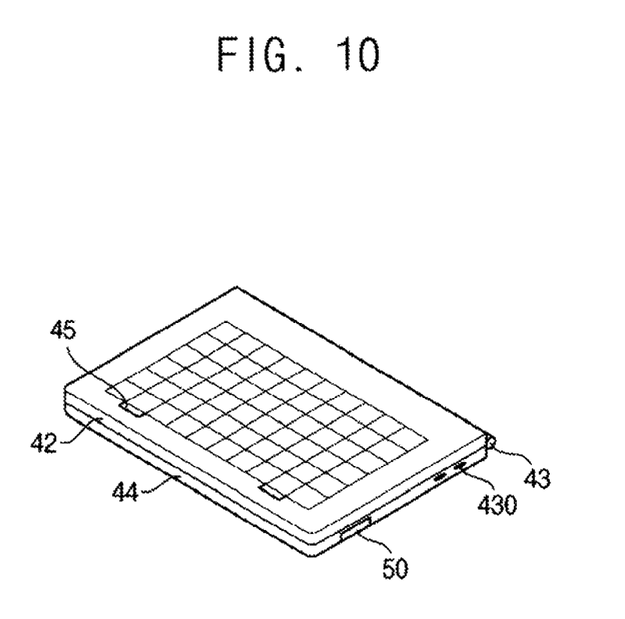
FIG. 10 is an assembled perspective view of the display apparatus shown in FIG. 8.

FIG. 8 is a perspective diagram of a display apparatus 7 including the power supply apparatus of FIG. 1. FIG. 9 is a side view of the display apparatus shown in FIG. 8. FIG. 10 is an assembled perspective view of the display apparatus shown in FIG. 8.

Referring to FIGS. 8 to 10, a display apparatus 7 may include a power supply apparatus, a display panel 42, a body 44 and a backlight assembly (not shown). The display apparatus 7 may be, for example, a portable handheld display apparatus such as a laptop computer, a mobile communication terminal, a personal digital assistant (PDA), or a portable multimedia player (PMP).

The display panel 42 includes a display part 420 on which an image is displayed. The display panel 42 may include a liquid crystal layer. The display panel 42 receives light from the backlight assembly.

The backlight assembly is disposed below the display panel 42 to provide the display panel 42 with light. The backlight assembly may generate light in response to an enable signal.

The display panel 42 is rotated by a first hinge 43 towards the body 44 to close the display apparatus 7, or away from the body 44 to open the display apparatus 7.

The body 44 includes an input part 410 and a terminal part 430. The input part 410 receives information in response to a user's operation. For example, the input part 410 may be a keyboard of a laptop computer, or a keyboard of a mobile communication terminal.

The terminal part 430 may be connected to an external device (not shown) or an external power device (not shown) to receive information or power. The terminal part 430 may receive the external voltage V1 provided from a power part 30 through a cable 46.

The power supply apparatus may include a solar battery part 10, the power part 30 and a storage battery 50. The power supply apparatus according to the present exemplary embodiment is substantially similar to the power supply apparatus of FIGS. 1, 2, 5 and 6. Thus, any repetitive detailed explanation of the power supply apparatus will hereinafter be omitted.

When the external voltage V1 is not provided, the solar battery part 10 charges the storage battery 50 using the voltage V3 of the solar battery 110 based on the first control signal S1, or provides the display apparatus 7 with the voltage V3 of the solar battery 110 and the charged voltage V2 of the storage battery 50.

The first control signal S1 may control other functions of the display apparatus 7. For example, the first control signal S1 may further be used as an enable signal for enabling a backlight assembly included in the display apparatus 7. Thus, for example, when the first control signal S1 (e.g., the enable signal) is high, the backlight assembly in the display apparatus 7 may be enabled, and the storage battery 50 may be discharged.

In the present exemplary embodiment, the solar battery part 10, the power part 30, and the storage battery 50 may be formed separately, or may be integrated within a single chip. Further, the power part 30 and the display apparatus 7 may be formed separately, or the power part 30 may be formed in an inner portion of the display apparatus 7. Further, the storage battery 50 may be formed at a side surface of the display apparatus 7, in an inner portion of the display apparatus 7, or on an exterior portion of the display apparatus 7. Further, the solar battery 110, the connecting part 130, the converting part 190, the mode selecting part 150 and the battery life extending part 170 may be formed on a single substrate, or on a plurality of separate substrates, respectively.

The solar battery part 10 may be disposed on a rear surface of the display panel 42. The solar battery part 10 may be attached to the rear surface of the display panel 42 through a second hinge 45, which allows the solar battery part 10 be rotated by a predetermined angle.

Since the efficiency of a solar battery is improved when sunlight is vertically incident thereto, the solar battery part 10 may be adjusted in order to receive sunlight in a vertical manner. When the display apparatus 7 is not in use, the solar battery part 10, the display panel 42 and the body 44 may be assembled as shown in FIG. 10.

In the present exemplary embodiment, although an external voltage is not connected to the portable display apparatus 7, the storage battery 50 may be charged using the solar battery 110, thus extending the discharge time of the storage battery 50, and enhancing the portability of the portable display apparatus 7.

As described above, according to the exemplary embodiments of the present invention, a solar battery is used to drive an electronic device when an external voltage is not provided, thus enhancing the portability of the electronic device. For example, the solar battery may be utilized while discharging the storage battery as well as while charging the storage battery, resulting in improved efficiency of the solar battery.

While the present invention has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. A method of supplying power, comprising:
    providing an external voltage to an electronic device and simultaneously charging a storage battery using the external voltage, upon determining that the external voltage is provided to a power supply apparatus;
    charging the storage battery using a voltage output by a solar battery, upon determining that the external voltage is not provided to the power supply apparatus and the electronic device is not in use;
    providing the voltage output by the solar battery and a charged voltage output by the storage battery to the electronic device, upon determining that the external voltage is not provided to the power supply apparatus and the electronic device is in use,
    wherein the voltage output by the solar battery and the charged voltage output by the storage battery are provided to the electronic device upon determining that a control signal is in a first logic state,
    wherein the storage battery is charged using the voltage output by the solar battery upon determining that the control signal is in a second logic state; and
    adding the voltage output by the solar battery and the charged voltage output by the storage battery upon determining that the control signal is in the first logic state.

2. A method of supplying power, comprising:
    providing an external voltage to an electronic device and simultaneously charging a storage battery using the external voltage, upon determining that the external voltage is provided to a power supply apparatus;
    charging the storage battery using a voltage output by a solar battery, upon determining that the external voltage is not provided to the power supply apparatus and the electronic device is not in use;
    providing the voltage output by the solar battery and a charged voltage output by the storage battery to the electronic device, upon determining that the external voltage is not provided to the power supply apparatus and the electronic device is in use,
    wherein the voltage output by the solar battery and the charged voltage output by the storage battery are provided to the electronic device upon determining that a control signal is in a first logic state,
    wherein the storage battery is charged using the voltage output by the solar battery upon determining that the control signal is in a second logic state; and
    boosting the voltage output by the solar battery upon determining that the control signal is in the first logic state.

3. The method of claim 2, wherein boosting the voltage output by the solar battery comprises:
    outputting a feedback signal based on a voltage difference between the voltage output by the solar battery and the charged voltage of the storage battery; and boosting the voltage output by the solar battery based on the feedback signal, wherein the boosted voltage is substantially the same as the charged voltage.

4. A power supply apparatus, comprising:
a storage battery configured to provide a charged voltage to an electronic device;
a power part configured to provide an external voltage to the electronic device and simultaneously charge the storage battery using the external voltage, upon determining that the external voltage is provided to the power supply apparatus; and
a solar battery part configured to charge the storage battery using a voltage output by a solar battery upon determining that the external voltage is not provided to the power supply apparatus and the electronic device is not in use, and provide the voltage output by the solar battery and the charged voltage output by the storage battery to the electronic device upon determining that the external voltage is not provided to the power supply apparatus and the electronic device is in use,
wherein the solar battery part comprises:
the solar battery configured to generate a voltage using a received light;
a battery life extending part configured to provide the electronic device with the voltage generated by the solar battery and the charged voltage of the storage battery;
a mode selecting part configured to provide the storage battery or the battery life extending part with the voltage generated by the solar battery, based on a control signal; and
a connecting part configured to electrically connect the solar battery and the mode selecting part, based on the external power.

5. The power supply apparatus of claim 4, wherein the battery life extending part is configured to add the voltage output by the solar battery and the charged voltage output by the storage battery.

6. The power supply apparatus of claim 4, wherein the solar battery part further comprises a converter configured to boost the voltage output by the solar battery and provide the mode selecting part with the boosted voltage.

7. The power supply apparatus of claim 6, wherein the battery life extending part comprises a comparator configured to provide a feedback signal to the converting part, wherein the feedback signal is based on a voltage difference between the voltage output by the solar battery and the charged voltage.

8. The power supply apparatus of claim 7, wherein the converting part is configured to boost the voltage output by the solar battery, and the boosted voltage is substantially the same as the charged voltage.

9. The power supply apparatus of claim 4, wherein the solar battery part comprises:
the solar battery configured to generate a voltage using a received light; and
a switching part configured to electrically connect the solar battery to one of the storage battery or the electronic device based on a control signal.

10. A display apparatus, comprising:
a display panel;
a backlight assembly disposed below the display panel, and configured to provide the display panel with a light in response to an enable signal; and
a power supply apparatus,
wherein the power supply apparatus comprises:
a storage battery configured to provide a charged voltage to the display apparatus;
a power part configured to provide an external voltage to the display apparatus and simultaneously charge the storage battery using the external voltage, upon determining that the external voltage is provided to the display apparatus; and
a solar battery part configured to charge the storage battery using a voltage output by a solar battery upon determining that the external voltage is not provided to the power supply apparatus and the display apparatus is not in use, and provide the voltage output by the solar battery and the charged voltage output by the storage battery to the display apparatus, upon determining that the external voltage is not provided to the power supply apparatus and the display apparatus is in use;
wherein the solar battery part comprises:
the solar battery configured to generate a voltage using a received light;
a battery life extending part configured to provide the display apparatus with the voltage generated by the solar battery and the charged voltage of the storage battery;
a mode selecting part configured to provide the storage battery or the battery life extending part with the voltage generated by the solar battery, based on a control signal; and
a connecting part configured to electrically connect the solar battery and the mode selecting part, based on the external power.

11. The display apparatus of claim 10, wherein the control signal functions as the enable signal provided to the backlight assembly.

12. The display apparatus of claim 10, wherein the battery life extending part is configured to add the voltage output by the solar battery and the charged voltage output by the storage battery.

13. The display apparatus of claim 10, wherein the solar battery part further comprises a converter configured to boost the voltage output by the solar battery and provide the mode selecting part with the boosted voltage.

14. The display apparatus of claim 13, wherein the battery life extending part comprises a comparator configured to provide a feedback signal to the converting part, wherein the feedback signal is based on a voltage difference between the voltage output by the solar battery and the charged voltage.

15. The display apparatus of claim 14, wherein the converting part is configured to boost the voltage output by the solar battery, and the boosted voltage is substantially the same as the charged voltage.

16. A display apparatus, comprising:
a display panel;
a backlight assembly disposed below the display panel, and configured to provide the display panel with a light in response to an enable signal; and
a power supply apparatus,
wherein the power supply apparatus comprises:
a storage battery configured to provide a charged voltage to the display apparatus;
a power part configured to provide an external voltage to the display apparatus and simultaneously charge the storage battery using the external voltage, upon determining that the external voltage is provided to the display apparatus; and
a solar battery part configured to charge the storage battery using a voltage output by a solar battery upon determining that the external voltage is not provided to the power supply apparatus and the display apparatus is not in use, and provide the voltage output by the solar battery and the charged voltage output by the storage battery to the display apparatus, upon determining that the external voltage is not provided to the power supply apparatus and the display apparatus is in use;

wherein the solar battery part comprises:

the solar battery configured to generate a voltage using a received light; and a switching part configured to electrically connect the solar battery to one of the storage battery or the display apparatus based on a control signal.

17. A solar battery part, comprising:

a solar battery configured to generate a voltage using a received light;

a mode selecting part configured to receive a control signal and select one of a charging mode or a life extending mode based on the control signal; and a battery life extending part configured to provide the voltage generated by the solar battery to a storage battery while in the charging mode, and to an electronic device while in the life extending mode.

18. The solar battery part of claim 17, further comprising a converting part configured to boost the voltage generated by the solar battery, and provide one of the voltage generated by the solar battery or the boosted voltage to the mode selecting part.

19. The solar battery part of claim 17, wherein the battery life extending part comprises a plurality of diodes configured to prevent a current leakage.

20. The solar battery part of claim 17, further comprising:

a connecting part configured to electrically connect the solar battery and the mode selecting part, wherein the mode selecting part is further configured to provide the storage battery or the battery life extending part with the voltage generated by the solar battery, based on the control signal.

21. The solar battery part of claim 20, further comprising:

a converter configured to boost the voltage generated by the solar battery and provide the mode selecting part with the boosted voltage.

* * * * *